United States Patent [19]

Kämpf

[11] Patent Number: 4,848,547
[45] Date of Patent: Jul. 18, 1989

[54] TORQUE LIMITING CLUTCH

[75] Inventor: Klaus Kämpf, Lohmar, Fed. Rep. of Germany

[73] Assignee: Jean Walterscheid GmbH, Fed. Rep. of Germany

[21] Appl. No.: 185,134

[22] Filed: Apr. 22, 1988

[30] Foreign Application Priority Data

May 14, 1987 [DE] Fed. Rep. of Germany ....... 3716105

[51] Int. Cl.$^4$ ............................................. F16D 41/04
[52] U.S. Cl. .................................. 192/56 R; 192/48.6; 192/48.92; 192/71
[58] Field of Search .................... 192/48.1, 48.3, 48.6, 192/56 R, 48.92, 45.1, 46, 71, 74, 75, 76, 89 A, 114 R; 464/37

[56] References Cited

U.S. PATENT DOCUMENTS

| | | | |
|---|---|---|---|
| 3,233,471 | 2/1966 | Benson et al. | 74/11 |
| 4,075,873 | 2/1978 | Geisthoff | 192/56 R |
| 4,220,230 | 9/1980 | Hansen | 192/56 R |
| 4,294,340 | 10/1981 | Kunze | 192/56 R |
| 4,468,206 | 8/1984 | Herchenbach et al. | 192/56 R X |
| 4,538,715 | 9/1985 | Konrad et al. | 192/56 R |
| 4,653,623 | 3/1987 | Demorest | 192/56 R |

FOREIGN PATENT DOCUMENTS 1598908  9/1981  United Kingdom ................. 192/46

Primary Examiner—Rodney H. Bonck
Assistant Examiner—Janice E. Chartoff
Attorney, Agent, or Firm—Toren, McGeady & Associates

[57] ABSTRACT

The invention relates to a torque limiting clutch consisting of a locking member clutch 1 and a free-wheeling clutch 3. The locking member clutch 1 comprises first locking members 4 which engage recesses 6 in the clutch sleeve 7. The locking members 4 are radially movably arranged in bores of the clutch hub and pretensioned by springs 14. After leaving the recesses 6, the cams 5 are prevented from swinging backwards by means of a tilting wedge 8 arranged in a receiving recess 20 of the clutch hub 3 and by supporting itself against the torque transmitting direction with its supporting face 12 on the supporting face 9 associated with a recess 10 in the clutch sleeve 7. In this way, the cams 5 are prevented from swinging backwards and being damaged in the process.

4 Claims, 3 Drawing Sheets

TORQUE LIMITING CLUTCH

DESCRIPTION

The invention relates to a torque limiting clutch for protecting drivelines, especially for driving or being incorporated in tractor-driven agricultural machinery or implements, consisting of a clutch hub and a clutch sleeve rotatably supported relative to the clutch sleeve, which two parts may assume either a torque transmitting position or a disengaged position relative to each other.

Such torque limiting clutches are frequently designed as locking member clutches. For this purpose, the clutch hub has been provided with radially movable locking members which by being loaded by a spring, are kept in contact radially outwardly with a cam face in recesses of the clutch sleeve. In cases of overloading, the cams are moved out of the recesses associated with them and the locking members are moved radially inwardly into the clutch hub bores receiving them. Clutch hub and clutch sleeve are capable of carrying out a relative movement relative to each other. As it is spring-loaded the locking member when moving past the nearest recess tries to enter it in order to build up torque again.

However, there frequently occurs a condition where, in view of the vibrations occurring in the drivelines of agricultural implements, the locking member is moved back into the recess which it just wanted to leave for disengaging purposes. It may also swing beyond the subsequent recess and then swing back again. As a rule, such return movements are jerky and lead to wear of the recesses and the associated cam faces, which then, overall, has a negative effect on the reaction behaviour of the clutch, even in the torque transmitting position. A clutch of the above type is known for instance from DE-PS No. 32 05 51 3.

It is the object of the present invention to provide a torque limiting clutch which ensures that the locking members are effectively transferred into the disengaged position and that any vibrations in the driveline do not permit the locking member to return into the torque transmitting position when it is just in the process of leaving the recess for disengaging purposes.

The objective is achieved by the combination of a locking member clutch with overload disconnecting means for the transmission of torque with a free-wheeling clutch whose free-wheeling direction corresponds to the torque transmitting direction, with the free-wheeling clutch being capable of being moved into the locking position immediately after transferring the locking member clutch into the disengaged position.

Free-wheeling clutches are usually used to transmit torque in one direction only. If stopped, they may be overtaken by the other clutch part in the torque transmitting direction, i.e. the non-driven part may follow. On the other hand it is possible for the clutch to be free-wheeling in the direction opposite to the torque transmitting direciton.

The solution proposed by the present invention consists in combining a locking member clutch with a free-wheeling clutch, with the free-wheeling clutch acting against its usual operating direction when combined with the locking member clutch. Furthermore, the two clutches are positioned relative to each other in such a way that the free-wheeling clutch does not produce a locking effect against the torque transmitting direction until the locking member clutch is in the disengaged position. This design feature is advantageous in that when a locking member has just left the respective recess as a result of overloading, it cannot be moved back by vibrations, because at that particular moment the free-wheeling unit blocks the movement in the opposite direction. On the other hand, the free-wheeling unit does not obstruct the disengaged position and the continued movement of the clutch parts into the disengaged position relative to each other. Nor is the clutch prevented from being re-engaged when speed is reduced should the locking member attempt to slide into one of the subsequent recesses which it passes.

Furthermore, as a result of the above ways of functioning the service life and the wear behaviour of the locking member clutch are improved.

A further preferred embodiment of the invention is characterised by a first set of spring loaded locking members which are radially and movably received in the clutch hub and which, via cams, in the torque transmitting position may engage clutch sleeve recesses adapted to their shape and may be moved out of the recesses in the disengaged position, and further characterised by a second set consisting of at least one second locking member which is associated with the clutch hub and which, when the first locking member is moved in the disengaged position, temporarily lockingly engages the clutch sleeve against the direction of torque transmission.

The first and second set of locking members provided in the above embodiment of the invention are associated relative to each other in such a way that starting from the torque transmitting position, the circumferential spacing angle between the supporting face of the recess for the second locking member in the clutch sleeve and the central axis of the first locking members and the recesses in the clutch sleeve associated with these is smaller than the spacing angle of the locking member supporting face of the second locking members relative to the central axis.

In a preferred embodiment, the second locking members are designed as radially tiltable wedges.

Free-wheeling clutches having wedges tiltable under load are known from U.S. Pat. No. 3,233,471 for example. If they are included in the teaching of this state of the art, they can only be used for torque transmitting purposes, the teaching consisting in locking in the torque transmitting direction and free-wheeling against the torque transmitting direction.

Furthermore, a preferred embodiment provides for the second locking members in the clutch hub and the associated recesses in the clutch sleeve to be axially offset relative to the first locking members in the clutch hub and their recesses in the clutch sleeve. In this way, free-wheeling unit and locking member clutch are prevented from interfering with each other.

A preferred embodiment of the torque limiting clutch in accordance with the invention is schematically illustrated in the drawing wherein FIG. 1 is a lateral view, partially in section, of the region of the first locking member (section 1—1 in FIG. 3).

Figure 1:
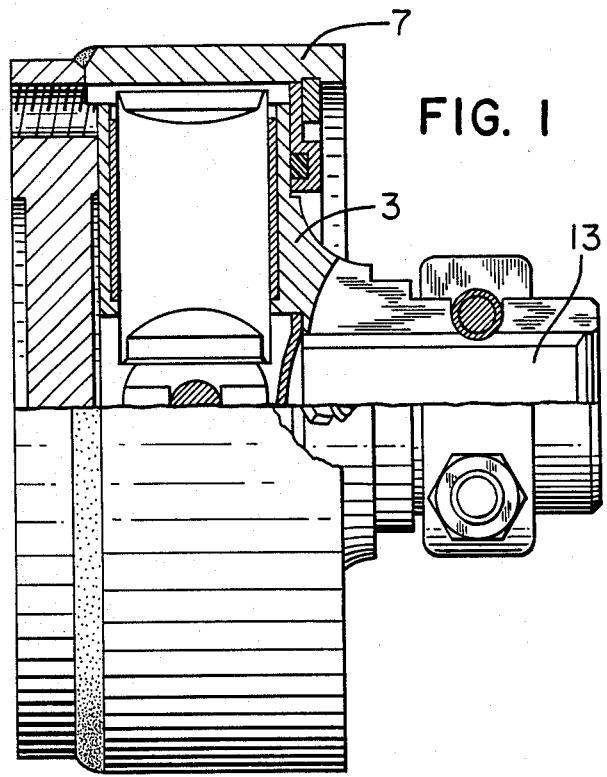
Figure 2:
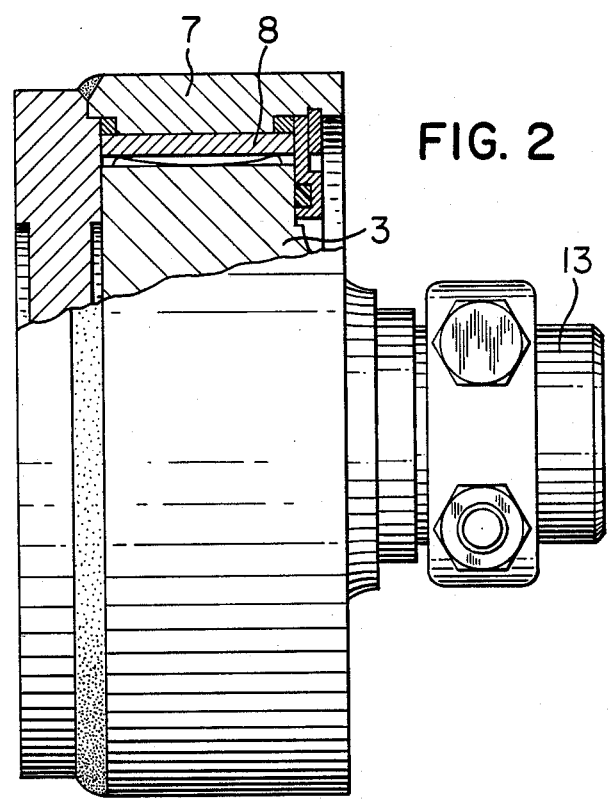
FIG. 2 is a lateral view, partially in section, of the region of the second locking member (section 2—2 to FIG. 3).
Figure 3:
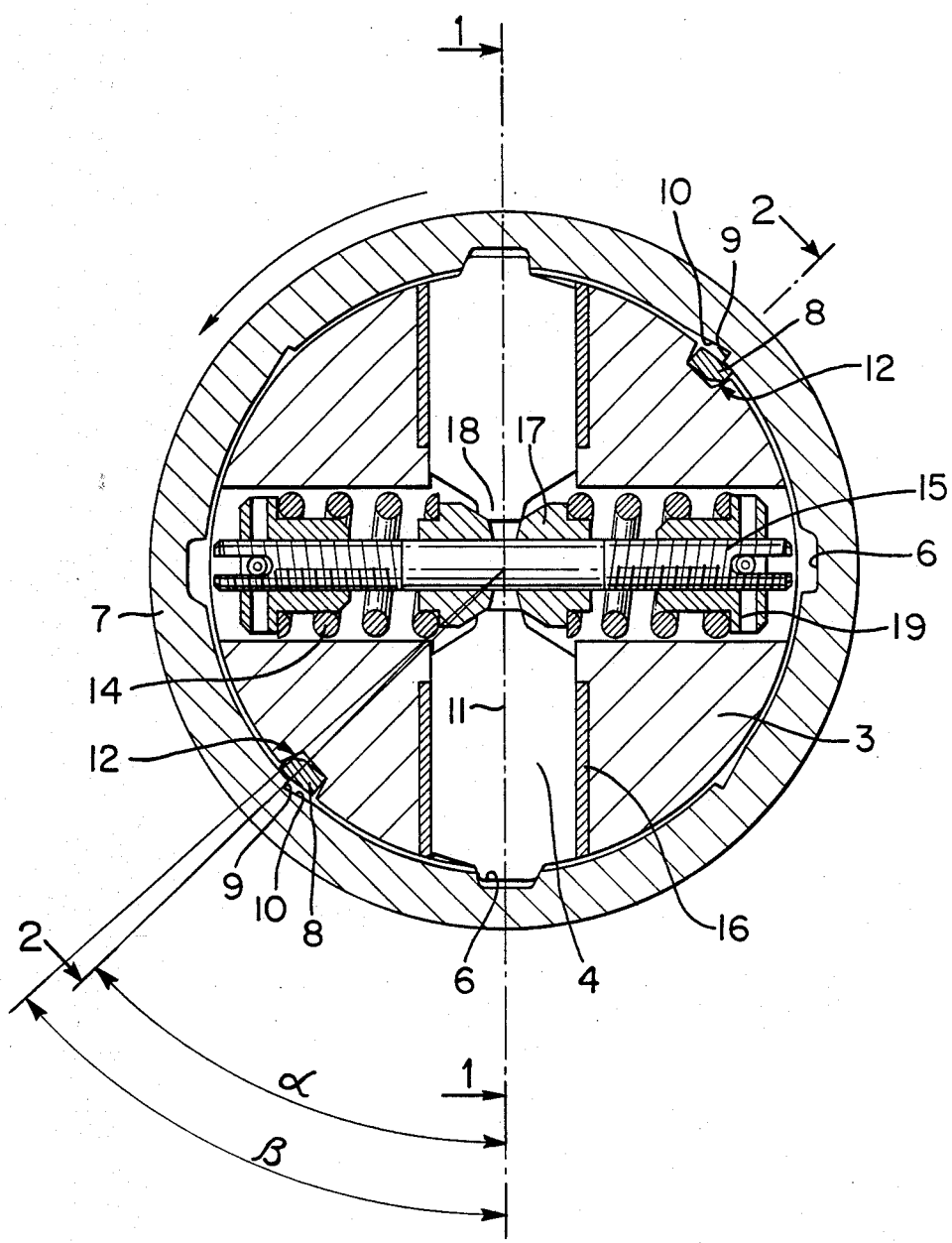
FIG. 3 is a cross-section through the overload clutch in the torque transmitting position.
Figure 4:
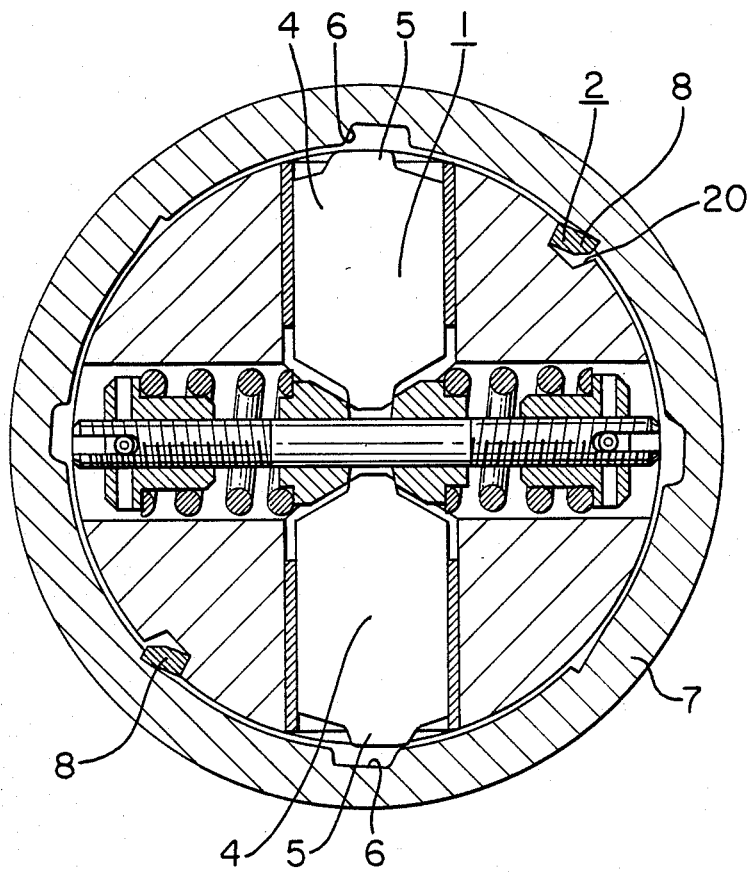
FIG. 4 is a cross-section through the overload clutch in the free-wheeling position.

The invention relates to a combination of a locking member clutch 1 with a free-wheeling clutch 2. However, the free-wheeling clutch does not operate in the torque transmitting direction but against the torque transmitting direction. First the functioning of the locking member clutch 1 and its design will be explained. The overload clutch comprises a clutch sleeve 7 in which a clutch hub 3 is received. The clutch hub 3 comprises an essentially radially extending part and an adjoining axial part in the form of a slip-on end 13. This slip-on end 13 is used to fix the overload clutch on a driveshaft in the form of a power takeoff shaft for example in a non-rotating way. If the drive is effected via the slip-on end 13, the clutch hub in the embodiment described here is driven so as to rotate counter clockwise. The clutch hub 2 is rotatably received in the clutch sleeve 7. However, it is held so as to be axially unmovable between a radially extending flange face and an abutment ring which is secured in the clutch sleeve against axial displacement by a securing ring. In the present embodiment, the clutch hub comprises two radially extending bores in which the first locking members 4 are held so as to be radially movable, with bushings 16 inserted therebetween. On their radially outer ends the first locking members 4 have been provided with cams 5 with which, in the torque transmitting position as shown in FIG. 3, they engage in corresponding recesses 6 in the clutch sleeve 7. The cross-section of the cams 5 is approximately trapezoidal. At their radially inner ends, the first locking members 4 have been provided with a further cam projection 18. Transversely to the bore in the clutch hub 3 which receives the first locking members, there extends a second bore in which switching cams 17 have been arranged in a pretensioned way which are pressing against the cam projections 18 via springs 14. This supporting assembly consists of a tensioning bolt which is received centrally in the respective bore and which radially inwardly comprises the switching cams 17 which, with inclined faces, rest against the cam projections 18 of the first two locking members 4. In an axial direction, there follow springs 14 which on the one hand are supported on the switching cams 17 and on the other hand against the supporting discs 19 which are screwed on to the ends of the tensioning bolt 15. In addition, after the required pretension has been set, the supporting discs 19 have been secured by tensioning pins to prevent any rotary displacement. For this purpose, the tensioning pins engage slots in the tensioning bolt 15 and may be inserted into bores in the supporting disc 19. Via the switching cams 17 pretensioned by the springs 14, the first locking members 4 are pressed radially outwardly. If overloading occurs, the locking member clutch 1 consisting of these components switches to free-wheeling, i.e. via the inclined faces of the recesses 6 in the clutch sleeve 7 and the correspondingly designed inclined faces of the cams 5, the first locking members 4 are pressed radially inwardly and slide on the wall of the clutch sleeve bore. The locking members 4, under the influence of the springs 14 loading them, try to enter the subsequent recesses 6. The circumference of the bore of the clutch sleeve 7 may be provided with several recesses 6 in such a way that always two recesses 6 are arranged so as to be diametrically opposed and cooperate with the cams 5 of the locking members 4. As agricultural drives for which locking member clutches 1 are used are frequently subject to vibrations, i.e. in cases of overloading there also occurs a return movement between parts, i.e. in case the clutch hub 3 is the driving part, there is not only an counterclock wise rotary movement, but also a clockwise rotary movement. If such a return movement occurs, the cams 5 may want to re-enter the recesses 6 which they have just either left or passed. This would have resulted in a switching on and off action, which would have had a disadvantageous effect on functioning. This is the reason why in addition to the locking member clutch 1 provision has been made for a free-wheeling clutch 2. This free-wheeling clutch 2 is provided in the form of second locking members designed as wedges 8 arranged in corresponding receiving recesses 20 of the clutch hub. The wedges 8 are designed as tilting wedges and can be tilted towards one side, i.e. radially outwardly. They comprise a supporting face 12 which cooperates with a corresponding supporting face 9 in the recess 10 of the clutch sleeve 7. The wedge 8 is held in contact with the bore wall of the clutch sleeve 7 by the spring associated with it. In case the clutch hub 3 swings back relative to the clutch sleeve 7, i.e. if it swings clockwise, the wedge 8, with its supporting face 12, is made to contact the supporting face 9 of the recess 10, as shown in FIG. 4. This prevents a further relative movement between the clutch sleeve 7 and the clutch hub 3. In the engaged condition as shown in FIG. 4, the cam of the first locking member 4 is prevented from radially moving into the recess 6. It is in a position in which the cam 5, with its head face, rests against the bore wall of the clutch sleeve. Such a condition is ensured in that, as the central axis 11 of the first locking members 4, in the engaged position as illustrated in FIG. 3, simultaneously forms the central axis of the recesses 6, the supporting face 9 of the clutch sleeve 7 for the wedge 8 is arranged at a smaller circumferential distance, i.e. at a smaller angle $\alpha$ than the supporting face 12 of the wedge in the tilted condition relative to the central axis 11 of the first locking members 4. The circumferential distance, i.e. the enclosed angle starting from the central axis 11 of the first locking members 4, starting from the axis of rotation of the clutch as far as the supporting face 12 of the wedge 8, has been named $\beta$, and according to the above definition, $\beta$ is greater than $\alpha$. Instead of arranging the parts 8 of the described shape between the two first locking members 4, it is also possible to arrange the locking member clutch 1 and the free-wheeling clutch 2 axially one behind the other.

I claim:

1. A torque limiting clutch for protecting drivelines, especially for driving or being incorporated in tractor-driven agricultural machinery or implements, consisting of a clutch hub and a clutch sleeve rotatably supported relative to the clutch hub, which two parts may assume either a torque transmitting position or a disengaged position relative to each other, characterised by the combination of a locking member clutch (1) with overload disconnecting means for the transmission of torque with a free-wheeling clutch (2) whose free-wheeling direction corresponds to the torque transmitting direction, the free-wheeling clutch (2) having a locking effect which extends in a direction opposite to the torque transmitting direction, the free-wheeling clutch (2) being capable of being moved into a locking position immediately after transferring the locking member clutch (1) into the disengaged position.

2. A torque limiting clutch according to claim 1, characterised by a first set of spring-loaded locking members (4) which are radially and movably received in the clutch hub (3) and which, via cams (5), in the torque transmitting position may engage clutch sleeve (7) recesses (6) adapted to their shape and may be moved out of the clutch sleeve recesses (6) in the disengaged position, and further characterised by a second set consisting of at least one second locking member (8) which is associated with the clutch hub (3) and which, when the first locking member (4) is moved in the disengaged position, temporarily lockingly engages the clutch sleeve (7) against the direction of torque transmission.

3. A torque limiting clutch according to claim 2, characterised in that starting from the torque transmitting position, a circumferential spacing angle between a first supporting face (9) of a recess (10) for the second locking member (8) in the clutch sleeve (7) and a central axis (11) of the first locking members (4) and the clutch sleeve recesses (6) in the clutch sleeve (7) associated with these is smaller than a distance from a second supporting face (12) of the second locking members (8) to the central axis (11).

4. A torque limiting clutch according to claim 2, characterised in that the second locking members are designed as radially tiltable wedges (8).

* * * * *